UNITED STATES PATENT OFFICE 2,115,550

LOW CELLULOSE UREA ALDEHYDE RESIN AND PROCESS OF MAKING SAME

Carleton Ellis, Montclair, N. J., assignor to Ellis-Foster Company, a corporation of New Jersey No Drawing. Application November 30, 1935, Serial No. 52,349

2 Claims. (Cl. 106—22)

This invention relates to urea-aldehyde molding compositions and process of making same, comprising essentially a minor proportion of cellulose and a major proportion of urea resin. In particular it relates to urea-aldehyde resin compositions containing a minor proportion of cellulose, which compositions can be hardened rapidly at a temperature of 140-150° C., removed hot from the mold without blistering and disintegrating, and which when hot immediately on hot-curing possess slightly elastic properties.

In various copending applications, such as Serial 689,165, filed Jan. 28, 1924, now Patent No. 2,075,804; Serial 694,420, filed Feb. 21, 1924; and Serial 426,192, filed Feb. 5, 1930, now Patent No. 2,092,502, I have pointed out the advantages of introducing organic fillers, such as wood flour or purified cellulose, into urea-aldehyde molding compositions for the purpose of facilitating molding and obtaining molded articles of increased strength and improved appearance. In the molding field there is desired not necessarily a perfectly infusible resin or binder but one which on solidifying at the molding temperature is sufficiently firm at that temperature to be removed from the molding press while still hot and be handled and exposed without deformation or loss of surface luster. The labor cost in molding is so great that the few minutes' time required to cool the mold in the production of plastics from fusible resins which do not harden or become thermo-rigid represents a considerable item in the total cost of manufacture. Hence the desirability of a resin not necessarily infusible but which will sufficiently harden in the mold at the molding temperature. Finally it may be noted that in the present instance definite and peculiar results have been obtained by the addition of fillers to the urea-formaldehyde resin. In view of the unexpected results obtained with reference to the heat-setting qualities, substantial absence of blistering even though the molded article is removed from the mold when hot, and other effects due to the presence of filler which show its action to be something other than a mere extending agent, I have set forth in the claims herein compositions comprising essentially urea-formaldehyde resin and filling material.

For the purposes of preparing a satisfactory molding composition, that is, a composition which hardens rapidly at curing temperatures and shows a minimum tendency to blistering, urea resin is preferably formed from about 1 mole of urea to 1½ moles of formaldehyde. These proportions are equivalent to a mixture of 1 mole of dimethylolurea and 1 mole of monomethylolurea. The methylolureas are the first products of the reaction between urea and formaldehyde and, as the reaction in aqueous solution is allowed to advance, these intermediate compounds condense to form larger molecules. Although condensation products of high molecular weight are eventually formed by condensation in aqueous solution, it has been shown that the products from a reaction which has advanced to such a stage that useful molding compositions can be made therefrom have a relatively low molecular weight. To account for these various facts and also to bring in the consideration that when rings of six members are possible in a chemical reaction such rings will be preferentially formed, the following formulas and course of the reaction are suggested for those products of the reaction of urea and formaldehyde that are best capable of yielding molding compositions.

$$2NH_2 \cdot CO \cdot NH_2 + 3CH_2O \rightarrow \underset{\substack{| \\ NHCH_2OH}}{\overset{NHCH_2OH}{CO}} + H_2N \cdot CO \cdot NH \cdot CH_2OH \rightarrow$$

(dimethylolurea)(monomethylolurea)

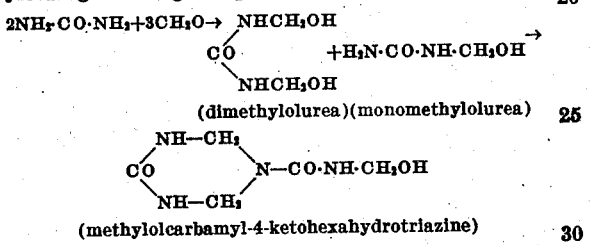

(methylolcarbamyl-4-ketohexahydrotriazine)

The latter compound would represent the first stage in the formation of higher compounds from methylolureas. Two molecules of the above triazine compound could condense to yield the following:

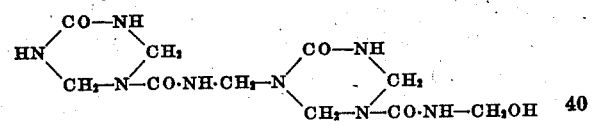

which could react further to form still higher compounds represented by the general formula:

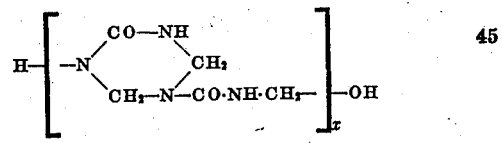

The products of the reaction of urea and formaldehyde in the hydrophilic stage are, therefore, characterized as being linear polymers of relatively low molecular weight ($x$ is a small number) and as having a terminal hydroxyl group. Reaction to yield modified resins is possible between this hydroxyl group and other compounds capable of reacting with hydroxyls. Acids have a great influence on hydrophilic urea resins, the action probably being ester formation. Also it is known that methanol affects the properties of urea-formaldehyde resin, this effect being considered etherification. Reaction with cellulose is therefore indicated as another means of modifying urea resin.

Cellulose is a polymer composed of glucose anhydride units.

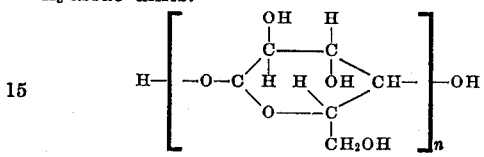

A name suggestive of its constitution is polyglucan (polymerized glucose anhydride). If urea resin reacts with cellulose it would be expected that 3 moles of urea condensation product would combine with each glucose anhydride unit. The compound of cellulose and the first resin intermediate shown hereinbefore would be named polymerized tri-(1-methylolcarbamyl-4-ketohexahydrotriazine) glucan. Compounds of cellulose with other urea-aldehyde condensation products can be named in an analogous manner. However, for convenience, as well as to have a simple generic term, the name glucanure or uroglucan is here given to the entire series of compounds formed by reaction of cellulose with the various condensation products of urea and aldehydes.

These compounds would be composed of a minor proportion of cellulose and a major proportion of urea-formaldehyde condensation product in the ratio of about 1 part cellulose to 3 parts resin, ranging to higher proportions of resin depending upon the degree of condensation attained in the urea-formaldehyde reaction. For example, the compound formed from cellulose and methylolcarbamyl-4-ketohexahydrotriazine would correspond to about 23% cellulose and 77% urea condensation product or 1 part cellulose to 3.3 parts resin. The composition of the compound of cellulose with the next higher triazine derivative would be about 14% cellulose and 86% resin or about 1 part cellulose to 6 parts resin. Likewise the compound of cellulose with the trimeric triazine derivative would correspond to about 11% cellulose and 89% resin or about 1 part cellulose to 8 parts resin. The hydrophile product of the reaction between urea and formaldehyde is composed of a mixture of compounds of varying molecular weight. However, in general the average composition of uroglucan is included in the range of 1 part cellulose to 3 parts resin up to 1 part cellulose to about 9 parts resin.

That cellulose actually forms a compound with urea resin can be shown by X-ray examinations of a mixture of cellulose and resin. Further, as will appear herebelow, the composition of this compound in the case of a particular urea condensation product is about 1 part cellulose to 5 parts resin.

A mixture of 560 grams 37% formaldehyde (pH 7), 276 g. urea and 0.28 g. magnesium carbonate was heated to boiling under a reflux condenser for 1 hour and 20 minutes. The syrup thus obtained was mixed with alpha cellulose in varying proportions. The compositions (including the urea resin itself) were dried in a current of air at 70° C. for 10 hours and were then ground to a powder in a ball mill. The dried samples had the following compositions:

1. 100% resin, 0% cellulose.
2. 90% resin, 10% cellulose.
3. 80% resin, 20% cellulose.
4. 60% resin, 40% cellulose.
5. 40% resin, 60% cellulose.
6. 20% resin, 80% cellulose.
7. 0% resin, 100% cellulose.

X-ray diffraction pictures of the samples were taken with a 0.020 inch beam of X-rays emitted from a copper target tube operating at 30,000 volts and 25 milliamperes. The beam was transmitted through a 0.15 cm. sample of the packed material. The film was placed perpendicular to the beam 5 cm. from the sample and an exposure time of 150 minutes was allowed. A lead arrow was placed in front of the main beam of X-rays close to the film to prevent excess fogging due to secondary radiation from the film itself.

The following table gives the radii in centimeters of the various rings which were shown in the X-rays photographs of the samples and the relative intensity of the various rings based upon clearness of definition above general fogging or uniform background. An intensity of 1 corresponds to a very faint ring or one that is barely visible above the background. Intensity 2 indicates a ring that is more distinct, etc., up to an intensity of 10 which corresponds to a very dark ring that is sharply defined.

*X-ray diffraction rings and their relative intensities*

| Rings (radius in cm.) | Composition No. | | | | | | | Character of ring (see below) |
|---|---|---|---|---|---|---|---|---|
| | 1 | 2 | 3 | 4 | 5 | 6 | 7 | |
| 1.30 | | | | 2 | 3 | 4 | 4 | Cel. |
| 1.50 | | | | 2 | 3 | 3 | 3 | Cel. |
| 1.70 | | 3 | 3 | 3 | 1 | | | Cpd. |
| 1.88 | 4 | 8 | 8 | 9 | 8 | 7 | 7 | E. |
| 2.08 | 7 | 7 | 7 | 9 | 10 | 9 | 8 | E. |
| 2.30 | 2 | 2 | 1 | 1 | | | | Res. |
| 2.50 | | 3 | 3 | 1 | | | | Cpd. |
| 2.64 | | | | | 1 | 2 | 3 | Cel. |
| 2.84 | | 1 | 1 | 1 | | | | Cpd. |
| 3.04 | | | | 1 | 2 | 2 | 3 | Cel. |
| 3.49 | | 1 | 2 | 4 | 6 | 7 | 7 | Cel. |

*Rings of 1.30, 1.50, 2.64, 3.04 and 3.49 cm. radius (designated "Cel" in the table)*.—These rings are due to cellulose. As the proportion of cellulose in the compositions decreases, they decrease in intensity on account of dilution of the cellulose. As a rule they do not appear in compositions high in resin.

*Rings of 1.70, 2.50 and 2.84 cm. radius (designated "Cpd" in the table)*.—These rings are not shown by either resin or cellulose alone. The appearance of new rings in the pattern for a mixture made from two components indicates combination between the components of the mixture to form a new compound. The rings under consideration are evidently caused by a cellulose-resin compound which is formed in all cases where cellulose and urea resin are mixed. These rings are of maximum intensity in compositions low in cellulose, indicating a composition low in cellulose for the compound. As the proportion of cellulose in the above compositions is increased, the rings to the cellulose-resin compound are masked by the increasing amount of uncombined cellulose.

*Rings of 1.88 and 2.08 cm. radius (designated "E" in the table)*.—These rings are shown by both cellulose and resin. Their presence in an enhanced form in compositions containing cellulose and resin is another indication of compound formation.

*Ring of 2.30 cm. radius (designated "Res." in the table).*—This is a resin ring. As the amount of cellulose in the series increases this ring decreases in intensity and finally disappears, in the same way that the cellulose rings ("Cel") become masked as the amount of resin increases.

Therefore, it is thus shown that when cellulose and urea resin are mixed they are able to combine. When cellulose is taken in excess of that amount which combines with the resin the resulting composition consists of cellulosate (e. g., glucanure or uroglucan) and free cellulose. When urea resin is taken in excess of that amount which combines with the cellulose the resulting composition consists of cellulosate and uncombined resin. The cellulosate is believed to confer in large measure the desirable property of hot-elasticity to hot-molded urea resin compositions, enabling easy removal of the hot molded article from the mold without disintegration. Compositions containing a high proportion of cellulose (above about 40%) do not have sufficient hot-elasticity to permit the molding of threaded articles which can be stripped from the mold-threads without cracking. It is therefore an object of this invention to provide molding compositions which contain a minimum of cellulose in uncombined form, or at least with only a moderate excess of cellulose present.

It should be noted that preferably I obtain the cellulosate, glucanure or uroglucan as it is variously termed, in the form which is substantially fibrous, that is, in reacting the cellulose with the urea resin condensate no material alteration in the fibrous character of the cellulose results. It is true, of course, that there may be some shortening of the fiber due to grinding treatment or otherwise, as when wood flour is used, but in the main I seek to produce the glucanure in the fibrous form more or less closely resembling that of the original cellulose. When subsequently hot-molded there is to the eye a disappearance of fiber to some extent which constitutes virtually a delignification.

The following examples are given by way of illustrating the foregoing.

*Example 1.*—One thousand parts of neutral formalin and 500 parts of urea were boiled under a reflux condenser for 1 hour, keeping the acidity of the mixture at pH 6.5 during the reaction. Portions of the resin syrup thus obtained (which contained about 40% initial condensation products of urea and formaldehyde), were mixed with alpha cellulose to give compositions which contained cellulose in the proportions of 40%, 30%, 25%, 20%, 15% and 10% based on total resin and cellulose. Each composition was dried in a current of air at 63° C. and ground to a powder in a ball mill, after which glycerol dichlorhydrin in the proportion of 1.5 cc. per 100 g. of powder and zinc stearate, 0.35 g. per 100 g. of powder, were added. Moldings were made on each composition at a temperature of 140° C. and a curing time of 5 minutes.

The composition containing 40% cellulose and 60% resin, when hot immediately on heat-curing, was easily removable from the mold without blistering or disintegrating. The elasticity of the hot article was somewhat low. Although the molding could be flexed somewhat when hot, breakage occurred if bent very far. The translucency, as well as the water-resistance, was good.

The composition containing 10% cellulose and 90% resin was also easily removable from the mold without blistering or disintegrating and possessed hot-elasticity to such a degree that under a stress it became deformed but recovered its original form when the stress was removed. The moldings were highly translucent, strong, and showed a more glossy surface than obtained with high proportions of cellulose.

*Example 2.*—Urea 840 parts, thiourea 300 parts, aqueous formaldehyde solution (formalin) 2400 parts. The solution contained 37.1 per cent actual formaldehyde and was used in practically neutral form with pH 5.6.

The urea and formaldehyde solution were mixed in the cold and heated under a reflux condenser to boiling point. Boiling was continued for 10 minutes, the temperature under these conditions being approximately 97.5° C. At the end of 10 minutes the thiourea was added and the boiling continued for a total period of 30 minutes. The hot solution was poured onto 730 parts of wood flour (the latter passing 20 mesh sieve). After being well mixed the wet mass was dried by spreading out on screens of Monel metal placed in a drying chamber through which a gentle current of air was passed, the temperature ranging from 30° up to about 52° C. Drying was continued until the lumps of the material had a brittle feel and could be readily crushed or ground in a ball mill. At this stage drying was considered complete and the batch was placed in a ball mill where it was ground for a period of about 1 hour until fine enough to pass a 40 mesh sieve.

This molding composition (containing 26% cellulose as wood flour) was tested for its molding properties by conducting pressings at 3000 lbs. pressure per square inch and temperatures of the mold ranging from 100 to 140° C. The product possessed an extremely good flow and yielded light brown shaped articles of a very attractive translucent glazed appearance. Some of these specimens were pressed only to a semi-cured stage and then were baked for 3 days at a temperature of 65° C.

*Example 3.*—Using the same quantities as in Example 2 of urea, thiourea and formaldehyde solution (the latter being in the zone of neutrality with a pH of 5.3), a reaction period of boiling for 50 minutes yielded a syrupy solution to which was added 10 per cent of wood flour based on the total solids in the solution. The mixture was dried in a vacuum oven at a temperature of about 70° C. until sufficiently dry for molding. After drying and grinding, pressing tests were conducted and it was found that the composition cured nicely in the mold without blistering and furnished excellent very translucent molded specimens.

*Example 4.*—Eight hundred forty parts urea, 300 parts thiourea and 2250 parts formalin solution were used. In this case note that the proportion of the latter is reduced over that employed in Examples 2 and 3. The pH was 7.2 and the boiling conducted for 30 minutes. A fine grade of wood flour was incorporated with the syrup to yield approximately 36 per cent cellulose material based on the dry weight. On drying overnight at about 60° C. a crisp product was obtained which ground readily in the ball mill. After grinding the batch was separated into two parts, to one of which was added glycerol dichlorhydrin equivalent to approximately 1½ per cent of the dry weight. The product containing the latent catalyzer when molded at 140° C. and higher gave shaped articles which showed excellent resistance to boiling water. A product of this kind can be used to make various molded articles as such or employed as a backing or support for cellulose sheet veneer.

Although translucent effects may be obtained when employing ground wood or wood flour as a filler, the color is yellow or brown which in some cases is undesirable. Wood flour, however, may be employed as a filler with or without mica powder, glassine pulp and the like. The proportion of filler to resin may vary depending on the character of the surface desired and the use to which the article is to be put. In general a somewhat larger proportion of resin than filler is desirable for effective translucency.

A bleached wood flour may be employed to assist in securing a pure white tone. An asbestos fiber which has been treated with acids to bleach out iron may be used to some extent so long as the conditions for glucanure formation are established. In addition various other fibrous fillers such as cotton flock, wool flock, silk flock and the like may be used. To the glucanure miscellaneous additions of various bodies such as resins (natural and/or synthetic) which are compatible, likewise nitrocellulose and the like may be incorporated or reacted as the case may be.

The invention thus contemplates a molding composition comprising essentially a minor proportion of cellulose and a major proportion of urea aldehyde resin, the cellulose being not less than 10% nor more than 50% of the urea resin; the composition being capable of hardening rapidly at a temperature in the neighborhood of 140°–150° C. and being capable of removal hot from a (hot-press) mold without objectionable blistering or disintegration: the molding possessing slightly elastic properties when hot immediately on such heat curing.

When urea is mentioned herein it is, of course, understood that I embrace those derivatives or mixtures thereof which serve as equivalent compounds or mixtures.

What I claim is:

1. A molding composition comprising essentially cellulose impregnated with a urea-aldehyde resin syrup formed from about 1 mol. of urea to about 1½ mols of aldehyde, the ratio between the cellulose and resin being about 1 part of cellulose to from about 3 to 9 parts of the resin, said composition hardening rapidly at a temperature of 140 to 150° C. and being capable of removal hot from the mold without blistering and disintegrating, and possessing slightly elastic properties when hot immediately on heat curing.

2. The process of making a molding composition which hardens rapidly at a temperature of 140 to 150° C. and which is capable of removal hot from the mold without blistering and disintegrating and which possesses slightly elastic properties when hot immediately on heat curing, which comprises impregnating cellulose with a urea-aldehyde resin syrup derived from the condensation of about 1½ mols of aldehyde with about 1 mol. of urea, the ratio of cellulose to resin being about 1 part of cellulose to about 3 to 9 parts of resin, and drying the impregnated cellulose.

CARLETON ELLIS.